United States Patent Office 3,639,485
Patented Feb. 1, 1972

3,639,485
ANTI-OZONANT
Roland Nast, Cologne-Buchheim, Kurt Ley, Leverkusen, Wolfgang Redetzky, Opladen, and Theo Kempermann, Cologne-Lindenthal, Germany, assignors to Farbenfabriken Bayer Aktiengesellschaft, Leverkusen, Germany
No Drawing. Filed July 16, 1968, Ser. No. 745,091
Claims priority, application Germany, Feb. 5, 1968, F 54,738
Int. Cl. C07c *149/00, 43/18*
U.S. Cl. 260—609 R                    19 Claims

ABSTRACT OF THE DISCLOSURE

[Cyclohexen-(3)-ylidene-methyl]-hydrocarbon ethers and thioethers and their corresponding 2,5-endomethylene derviatives, preparation thereof and their use as anti-ozonants.

---

This invention relates to an anti-ozonant.

It is known that consumer goods obtained by vulcanisation from polychloroprene develop cracks when their surface is under mechanical strain, whether through elongation, compression or shearing, and are at the same time, exposed to the effects of ozone. Although the resistance to ozone of products such as these is considerably higher than that of products made of, for example, natural rubber or styrenebutadine rubber, it is still far from adequate in many cases. The service life of polychloroprene goods can be significantly increased by the addition to the rubber in relatively small quantities of p-phenylene diamine derivatives such as, for example, N-phenyl-N'-isopropyl-p-phenylene diamine. Unfortunately, all the hitherto known effective compounds of this kind discolour under the effect of light so that they can only be used in articles containing carbon black. However, it is only possible in some cases to use articles containing carbon black of the kind that do not discolour adjoining materials on contact therewith. It is also known that certain wax combinations can be used to improve the resistance to ozone of light products. Although combinations such as these do exert a certain protective effect, they will only produce this effect providing the film of protective wax formed over the surface of the object remains fully intact. Unfortunately, the film tears very easily under dynamic stress with the net result that the ozone-induced cracks developed at these breaks in the film tend to be deeper and wider than those formed in the absence of the wax film. Even when the wax film remains fully intact, protection is far from complete because a small quantity of ozone still penetrates through the film and ultimately gives rise to the development of cracks.

We have now found that vulcanisates which are more resistant to ozone can be obtained by using as anti-ozonants in rubber products containing at least 20% by weight of polychloroprene, based on the total polymer content, compounds corresponding to the formulae:

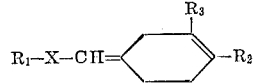

and

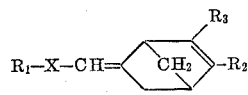

in which $R_1$ represents a hydrocarbon radical containing from 3 to 18 carbon atoms which may optionally contain oxygen (—O—) or sulphur (—S—) moieties, X represents oxygen (—O—) or sulphur (—S—), $R_2$ and $R_3$ each represent hydrogen or a methyl radical. One particularly significant technological advantage of the compounds used in accordance with the invention is that they do not discolour.

The hydrocarbon radical $R_1$ preferably consists of linear or branched alkyl radicals with from 3 to 18, and preferably 4 to 12, carbon atoms which may optionally be interrupted by hetero atoms such as for example oxygen or sulphur, aryl radicals, preferably phenyl and naphthyl, and aralkyl radicals, preferably containing phenyl as the aromatic component and between 1 and 3 carbon atoms in the aliphatic chain, in which case the chain of the aralkyl radical may optionally be further interrupted by a hetero atom, such as for example oxygen or sulphur.

The enolethers according to the invention may be prepared by conventional methods, for example, by reaction aldehydes with alcohols or mercaptans in the presence of acids as catalysts to form the corresponding acetals or thioacetals. The compounds formed in the first stage are converted in a second reaction stage into the corresponding enol- or thioenolethers by heat treatment which is accompanied by the elimination of alchohol or mercaptan. Thioenolethers may also be directly formed from mercaptans and aldehydes provided the reaction is carried out with a molar ratio of 1:1.

As a rule, the water formed during the acetal formation is azeotropically distilled off from a mixture of 1 mol of the aldehyde and at least 2 mols of an alcohol in the presence of catalytic quantities of a strong acid such as p-toluene sulphonic acid, for example, by means of an organic solvent which is immiscible with water such as, for example, chloroform, benzene, xylene or washing spirit or, optionally, by means of an excess of the alcohol used.

After the water has been removed, the reaction mixture is fractionated through a column at reduced pressure to split up the acetal formed in the first stage into alcohol and enol ether.

To prepare thioenolethers, a mixture of 1 mol of the aldehyde and 1 mol of a mercaptan is dehydrated by azeotropic distillation in the presence of catalytic quantities of a strong acid such as, for example, p-toluene sulphonic acid, by means of an organic solvent such as, for example, chloroform, benzene, toluene, xylene or washing spirit, resulting directly in the formation of the enolethers. The thioenol ether is then purified by distillation. In addition to p-toluene sulphonic acid, $\beta$- or $\alpha$-naphthalene sulphonic acid, orthophosphoric acid and polyphosphoric acids, for example, may also be used as the strong acids added in catalytic quantities in the preparation of enolethers and thioenolethers. It is of course also possible to use strongly acid ion exchangers for the purpose of acid catalysis.

The following compounds are mentioned by way of example as starting materials for the preparation of the enolethers according to the invention: aldehydes such as Δ3-tetrahydrobenzaldehyde,
Δ3-3 or 4-methyltetrahydrobenzaldehyde,
Δ3-2-methyltetrahydrobenzaldehyde,
Δ3-3,4-dimethyltetrahydrobenzaldehyde,
Δ3-4-chlorotetrahydrobenzaldehyde,
Δ3-3,4-dichlorotetrahydrobenzaldehyde,
Δ3-4-cyanotetrahydrobenzaldehyde,
Δ3-2,5-endomethylenetetrahydrobenzaldehyde;

alcohols such as for example n-butanol, isobutanol, n-octanol, i-octanol, i-nonylalcohol, n-dodecanol, benzyl alcohol, cyclohexanol, 4-tert.butylcyclohexanol, 2-phenylethanol, 3-phenyl-propanol, ethylene glycol monopropylether, ethylene glycol mono butylether, ethylene glycol monohexylether, diethylene glycol monomethylether, diethylene glycol monoethylether, diethylene glycol monobutylether; hydroxyalkylphenylethers such as, for example, 2-phenoxyethanol, 2-(4-methylphenoxy)-ethanol; hydroxyethylalkyl or aryl sulphides such as for example 1-hydroxyethylmethyl sulphide, -n-butylsulphide, -n-dodecylsulphide, -benzylsulphide, -phenyl sulphide, -[4-methylphenyl]-sulphide, [4 - tert.-butylphenyl]-sulphide or mercaptans such as, for example, n-dodecyl mercaptan and 4-tert.-butylthiophenol.

Examples of the enolethers claimed in accordance with the invention include

[cyclohexen-(3)-ylidene-methyl]-n-butylether,
[cyclohexen-(3)-ylidene-methyl]-n-hexylether,
[3-(or -4)-methylcyclohexen-(3)-ylidene-methyl]-n-hexylether,
[cyclohexen-(3)-ylidenemethyl]-i-octylether,
[3-(or -4-)-ylidene-methyl]-i-nonylether, octylether,
[3-(or -4)-methylcyclohexen-(3)-ylidene-methyl]-benzylether,
[cyclohexen-(3)-ylidene-methyl]-benzylether,
[cyclohexen-(3)-ylidene-methyl]-i-nonylether,
[cyclohexen-(3)-ylidene-methyl]-n-dodecylether,
[3-(or -4)-methylcyclohexen-(3)-ylidene-methyl]-n-dodecyl thioether,
[3-(or -4)-methylcyclohexen-(3)-ylidene-methyl]-4-tert.-butylphenyl thioether,
[cyclohexen-(3)-ylidene-methyl]-n-butyl-diethylene glycolether;
[cyclohexen-(3)-ylidene-methyl]-phenyl-ethylene glycolether;
[4-chlorocyclohexen-(3)-ylidene-methyl]-n-hexylether,
[4-cyanocyclohexen-(3)-ylidene-methyl]-i-octyl ether,
[3,4-dichlorocyclohexen-(3)-ylidene-methyl]-n-butylether,
[2-methylcyclohexen-(3)-ylidene-methyl]-benzylether,
[cyclohexen-(3)-ylidene-methyl]-cyclohexylether,
[2,5-endomethylene-cyclohexen-(3)-ylidene-methyl]-n-hexylether,
[2,5-endomethylene-cyclohexen-(3)-ylidene-methyl]-i-octylether,
[2,5-endomethylene-cyclohexen-(3)-ylidene-methyl]-n-dodecylether,
[2,5-endomethylene-cyclohexen-(3)-ylidene-methyl]-benzylether,
[2,5-endomethylene-cyclohexen-(3)-ylidene-methyl]-n-dodecylthioether,
[cyclohexen-(3)-ylidene-methyl]-[2-methyl-thioethyl]-ether and
[cyclohexen-(3)-ylidene-methyl]-[2-phenylthioethyl]-ether.

The compounds used in accordance with the invention may readily be distributed in rubber mixtures and may be used in conjunction with the chemicals normally used in rubber (for example, vulcanisation accelerators, vulcanising agents, anti-agers, plasticisers, fillers, waxes, dyes and so on), without in any way affecting their specific activity.

The novel products are used in the rubber in quantities of from 0.1 to 6.0% by weight, and preferably in quantities of from 0.3 to 3.0% by weight, based on the content of polymer which consists of 100.0% by weight of polychloroprene or polychloroprene with a co-vulcanisable rubber, the minimum polychloroprene content being 20% by weight, and preferably 30% by weight.

Examples of suitable co-vulcanisable rubbers include natural rubber or synthetic rubber-like polymers which still contain double bonds, and which are obtained for example from conjugated diolefins such as butadiene, dimethyl butadiene, isoprene and its homologues, or copolymers of conjugated diolefins such as these with polymerisable vinyl compounds such as, for example, styrene, α-methyl styrene, acrylonitrile, methacrylonitrile, acrylates and methacrylates.

The effect of the compounds used in accordance with the invention in vulcanisates containing polychloroprene lies both in a higher level of stabilisation against the effects of ozone and in a longer service life of rubber products exposed to the influences of ozone.

EXAMPLE 1

The following mixtures were prepared on mixing rolls:

|  | Parts by wt. |
|---|---|
| Polychloroprene | 100.0 |
| Magnesium oxide | 4.0 |
| Stearic acid | 0.5 |
| Precipitated silica (BET-surface 180 m.²/g.) | 20.0 |
| Soft kaolin | 170.0 |
| Titanium dioxide | 5.0 |
| Antimony oxide | 5.0 |
| Chloroparaffin | 10.0 |
| Naphthenic mineral oil plasticiser | 20.0 |
| Paraffin | 4.0 |
| Zinc oxide | 5.0 |
| Ethylene thiourea | 1.0 |
| Anti-ozonant according to Table 1 | 1.0 |

Test specimens measuring 0.4 x 4.5 x 4.5 cm. were prepared from these mixtures and vulcanised (press vulcanisation: 30 minutes at 151° C.).

Groups of four of the test specimens were then clamped in a plastics frame in such a way that elongations of 10%, 20%, 35% and 60% were developed over their surfaces. The test specimens were then treated with a stream of air containing 1000 parts of ozone to 100 million parts of air, at room temperature. Crack formation was then assessed at regular intervals as specified in the table set out below by counting the total number of cracks formed that were visible with the naked eye, and also by measuring their average length in accordance with the following system.

| Number of cracks: | | Average length of the cracks: | |
|---|---|---|---|
| No cracks | 0 | No crack formation | 0 |
| 1–2 cracks | 1 | Just visible | 1 |
| 3–9 cracks | 2 | 1–3 mm. | 2 |
| 19–24 cracks | 3 | 3–8 mm. | 3 |
| 25–79 cracks | 4 | More than 8 mm. | 4 |
| 80–249 cracks | 5 | | |
| More than 250 cracks | 6 | | |

In the following table, the results obtained are separated by a vertical line with the number of cracks indicated first in each case. In the tables, the symbol + means that the test specimen broke.

TABLE I

| Hours | 2 | 10 | 33 | 66 | 168 |
|---|---|---|---|---|---|
| (a) No anti-ozonant present | | | | | |
| Elongation, percent: | | | | | |
| 10 | 0/0 | 0/0 | 3/2 | 3/2 | 3/4 |
| 20 | 0/0 | 5/1 | 5/2 | 5/2 | 4/4 |
| 35 | 0/0 | 5/1 | 5/2 | 5/2 | + |
| 60 | 5/1 | 5/2 | 4/4 | + | + |
| (b) [cyclohexen-(3)-ylidene-methyl]-n-butylether | | | | | |
| Elongation, percent: | | | | | |
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 0/0 | 1/3 | 1/4 |
| (c) [3- (or -4)-methylcyclohexen-(3)ylidene-methyl]-n-butylether | | | | | |
| Elongation, percent: | | | | | |
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 1/2 | 1/4 | 1/4 |
| 60 | 0/0 | 4/2 | 4/4 | + | + |

TABLE I—Continued

| Hours | 2 | 10 | 33 | 66 | 168 |
|---|---|---|---|---|---|

(d) [cyclohexen-(3)-ylidene methyl]-n-hexylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 0/0 | 0/0 | 0/0 |

(e) [3- (or -4)-methylcyclohexen-(3)-ylidene-methyl] n-hexylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 0/0 | 0/0 | 0/0 |

(f) [cyclohexen-(3)-ylidene-methyl]-i-octylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 0/0 | 0/0 | 0/0 |

(g) [3- (or -4)-methylcyclohexen-(3)-ylidene-methyl]-n-octylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 0/0 | 0/0 | 0/0 |

(h) [3- (or -4)-methylcyclohexen-(3)-ylidene-methyl]-i-octylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 0/0 | 0/0 | 0/0 |

(i) [cyclohexen-(3)-ylidene-methyl]-i nonylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 1/1 | 1/3 | 1/4 | + |

(k) [cyclohexen-(3)-ylidene-methyl]-n-dodecylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 0/0 | 0/0 | 0/0 |

(l) [3- (or -4)-methylcyclohexen-(3)-ylidene-methyl]-n-dodecylthioether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 0/0 | 0/0 | 0/0 |

(m) [3- (or -4)-methylcyclohexen-(3)-ylidene-methyl]-4-tert.-butylphenyl thioether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 0/0 | 2/4 | 2/4 | + |

(n) [2,5-endomethylene-cyclohexen-(3)-ylidene-methyl]-n-hexylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 2/1 | 3/3 | + | + |

EXAMPLE 2

The following mixtures were prepared on mixing rolls:

| | Parts by wt. |
|---|---|
| Polychloroprene | 30.00 |
| Light crepe | 70.00 |
| Titanium dioxide | 50.00 |
| Zinc oxide | 70.00 |
| Stearic acid | 1.00 |
| Sulphur | 1.00 |
| Dibenzothiazyldisulphide | 0.70 |
| Tetramethylthiuram monosulphide | 0.30 |
| Ethylene thiourea | 0.20 |
| Magnesium oxide | 2.00 |
| Ultramarine blue | 0.02 |
| Anti-ozonant, cf. Table 2 | 0 and 1.00 |

Test specimens measuring 0.4 x 4.5 x 4.5 cm. were prepared from these mixtures and then vulcanised (press vulcanisation 30 minutes at 151° C.).

This test was carried out as described in Example 1, the only difference being that 200 instead of 1000 parts of ozone were used to 100 million parts of air. The results obtained are set out in Table 2:

TABLE 2

| Hours | 2 | 6 | 18 | 33 | 57 |
|---|---|---|---|---|---|

(a) No anti-ozonant present

Elongation, percent:
| | | | | | |
|---|---|---|---|---|---|
| 10 | 0/0 | 3/2 | 3/4 | 3/4 | 3/4 |
| 20 | 3/1 | 4/2 | 4/4 | 4/4 | 4/4 |
| 35 | 6/1 | 6/2 | 5/3 | 5/3 | 4/4 |
| 60 | 6/1 | 6/2 | 5/3 | 5/3 | 4/4 |

(b) [3-(or -4)-methylcyclohexen-(3)-ylidene-methyl]-n-octylether

Elongation, percent:
| | | | | | |
|---|---|---|---|---|---|
| 10 | 0/0 | 0/0 | 0/0 | 0/0 | 0/0 |
| 20 | 0/0 | 0/0 | 1/2 | 1/3 | 1/4 |
| 30 | 6/1 | 6/2 | 5/3 | 5/3 | 4/4 |
| 65 | 6/1 | 6/1 | 6/2 | 5/3 | 4/4 |

EXAMPLE 3

The following mixtures were prepared on mixing rolls

| | Parts by wt. |
|---|---|
| Polychloroprene | 35.00 |
| Styrene-butadiene copolymer | 65.00 |
| Titanium dioxide | 10.00 |
| Air-classified hard kaolin | 30.00 |
| Precipitated silica (BET-surface 180 m.²/g.) | 20.00 |
| Naphthenic mineral oil plasticiser | 5.00 |
| Stearic acid | 1.00 |
| Magnesium oxide | 2.00 |
| Zinc oxide | 5.00 |
| Ethylene thiourea | 0.25 |
| Dicyclohexylamine | 1.00 |
| Dibenzothiazyl disulphide | 1.00 |
| Tetramethyl thiuram monosulphide | 0.20 |
| Sulphur | 1.40 |
| Anti-ozonant cf. Table 3 | 0 and 2.00 |

Test specimens measuring 0.4 x 4.5 x 4.5 cm. were prepared from these mixtures and vulcanised in a press for 30 minutes at 151° C.

The tests were carried out as in Example 2. The results are set out in Table 3:

TABLE 3

| Hours | 2 | 6 | 18 | 33 | 57 |
|---|---|---|---|---|---|

(a) Non anti-ozonant present

Elongation, percent:
| | | | | | |
|---|---|---|---|---|---|
| 10 | 0/0 | 2/1 | 4/2 | 4/3 | 4/4 |
| 20 | 0/0 | 4/2 | 5/2 | 5/3 | 4/4 |
| 35 | 6/1 | 6/2 | 5/3 | 4/4 | 4/4 |
| 60 | 6/1 | 6/2 | 5/3 | 4/4 | 4/4 |

(b) [3-(or 4)-methylcyclohexen-(3)-ylidene-methyl]-n-dodecylthioether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 1/2 | 1/3 |
| 35 | 6/1 | 6/2 | 6/2 | 5/3 | 4/4 |
| 60 | 6/1 | 6/2 | 6/2 | 5/3 | 4/4 |

(c) [3-(or 4)-methylcyclohexen-(3)-ylidene-methyl]-n-octylether

Elongation, percent:
| | | | | | |
|---|---|---|---|---|---|
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 1/2 | 1/3 |
| 60 | 0/0 | 2/1 | 4/3 | 4/3 | 4/4 |

EXAMPLE 4

The following mixture was prepared on mixing rolls:

|  | Parts by wt. |
|---|---|
| Polychloroprene | 30.00 |
| Styrene-butadiene copolymer | 70.00 |
| Titanium dioxide | 10.00 |
| Air-classified hard kaolin | 30.00 |
| Precipitated silica (BET-surface 180 m.$^2$/g.) | 20.00 |
| Naphthenic mineral oil plasticiser | 5.00 |
| Stearic acid | 1.00 |
| Magnesium oxide | 2.00 |
| Zinc oxide | 5.00 |
| Ethylene thiourea | 0.20 |
| Dicyclohexylamine | 1.00 |
| Dibenzothiazyl disulphide | 1.20 |
| Sulphur | 1.60 |
| Tetramethyl thiuram monosulphide | 1.20 |
| Anti-ozonant cf. Table 4 | 0 and 2.50 |

Test specimens measuring 0.4 x 4.5 x 4.5 cm. were prepared from the mixtures and vulcanised in a press for 30 minutes at 151° C.

The tests were carried out as described in Example 1, the only difference being that 400 instead of 1000 parts of ozone were used to 100 million parts of air. The results obtained are set out in Table 4.

TABLE 4

| Hours | 2 | 6 | 18 | 33 | 57 |
|---|---|---|---|---|---|
| *(a) No anti-ozonant present* | | | | | |
| Elongation, percent: | | | | | |
| 10 | 0/0 | 3/2 | 4/3 | 4/4 | 4/4 |
| 20 | 3/1 | 4/2 | 5/3 | 4/4 | 4/4 |
| 35 | 5/1 | 6/2 | 4/4 | 4/4 | + |
| 60 | 6/1 | 6/2 | 4/4 | 4/4 | 4/4 |
| *(b) [cyclohexen-(3)-ylidene-methyl]-benzylether* | | | | | |
| Elongation, percent: | | | | | |
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 1/2 | 2/3 | 2/4 | 2/4 |
| *(c) [cyclohexen-(3)-ylidene-methyl] n-butyl ethylene glycol ether* | | | | | |
| Elongation, percent: | | | | | |
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 0/0 | 0/0 | 0/0 |
| 60 | 0/0 | 2/1 | 3/3 | 3/4 | 2/4 |
| *(d) [cyclohexen-(3)-ylidene-methyl]-ethyl diethylene glycol ether* | | | | | |
| Elongation, percent: | | | | | |
| 10 | 0/0 | 0/0 | 0/0 | 0/0 | 0/0 |
| 20 | 0/0 | 0/0 | 0/0 | 0/0 | 0/0 |
| 35 | 0/0 | 0/0 | 1/1 | 1/3 | 1/4 |
| 60 | 0/0 | 1/2 | 2/3 | 2/4 | 2/4 |
| *(e) [cyclohexen-(3)-ylidenemethyl]-phenyl ethylene glycolether* | | | | | |
| Elongation, percent: | | | | | |
| 10 | 0/0 | 0/0 | 0/0 | 0/0 | 0/0 |
| 20 | 0/0 | 0/0 | 0/0 | 0/0 | 0/4 |
| 35 | 0/0 | 0/0 | 0/0 | 1/1 | 1/0 |
| 60 | 3/1 | 3/2 | 4/4 | 4/4 | 4/0 |

EXAMPLE 5

The compounds used in accordance with the invention may be prepared as follows:

(a) General method of producing enol ethers

A mixture of 204 g. (2 mols) of n-hexanol-(1), 110 g. (1 mol) of tetrahydrobenzaldehyde and 200 ml. of toluene containing 1 g. of p-toluene sulphonic acid is heated for 3½ hours on a water separator until it boils. Following elimination of the water present, the reaction mixture is distilled through a column to split up the acetal obtained as the first stage into alcohol and enolether. [Cyclohexene-(3)-ylidene-methyl]-n-hexylether is obtained in a yield of 134 g.; colourless, thinly liquid oil of B.P.$_{12 mm.}$ 123–126° C.

The enolethers set out in Table 5 are similarly prepared:

TABLE 5

| Alcohol | Aldehyde | Enolether | B.P. (° C.) |
|---|---|---|---|
| 1-butanol | Tetrahydrobenzaldehyde. | [Cyclohexen-(3)-ylidene-methyl]-n-butyl-ether. | 96–97/ 12 mm. |
| 2-ethyl-1-hexanol (i-octanol). | do | [Cyclohexen-(3)-ylidene-methyl]-i-octyl-ether. | 141–142/ 12 mm. |
| 3,5,5-trimethyl-1-hexanol plus isomer (i-nonyl alcohol). | do | [Cyclohexen-(3)-ylidene-methyl]-i-nonyl-ether. | 151–152/ 12 mm. |
| 1-dodecanol | do | [Cyclohexen-(3)-ylidene-methyl]-n-dodecylether. | 197–202/ 12 mm. |
| 1-butanol | Tetrahydrotolylaldehyde. | [3-(or -4)-methylcyclohexen-(3)-ylidene-methyl]-n-butyl-ether. | 111–112/ 12 mm. |
| 1-hexanol | do | [3-(or -4)methylcyclohexen-(3)ylidene-methyl]-n-hexyl-ether. | 137–138/ 12 mm. |
| 2-ethyl-1-hexanol (i-octanol). | do | [3-(or -4)-methylcyclohexen-(3)-ylidene-methyl]-i-octylether. | 153–154/ 12 mm. |
| 1-octanol | do | [3-(or -4)-methylcyclohexen-(3)-ylidene-methyl]-n-octylether. | 163–168/ 12 mm. |
| Benzyl alcohol | Tetrahydrobenzaldehyde. | [Cyclohexen-(3)-ylidene-methyl]-benzyl-ether. | 155–156/ 12 mm. |
| Ethylene glycol monobutylether. | do | [Cyclohexen-(3)-ylidene-methyl]-n-butyl-ethylene glycolether. | 140/12 mm. |
| Diethylene glycol monoethyl-ether. | do | [Cyclohexen-(3)-ylidene-methyl]-ethylene-diethylene glycol-ether. | 134–135/ 4.5 mm. |
| 2-phenoxyethanol | do | [Cyclohexen-(3)-ylidene-methyl]-phenyl-ethylene glycolether. | 161/3.5 mm. |

(b) General method of producing thioenol ethers

A mixture of 125 g. (0.75 mol) of 4-tert.-butyl thiophenol, 93 g. (0.75 mol) of tetrahydrotolyl aldehyde and 150 ml. of xylene containing approximately 0.5 g. of p-toluene sulphonic acid is heated for 4 hours on a water separator until it boils. Following removal of the water, the reaction mixture is fractionated twice under a high vacuum. {3 - (or -4)methylcyclohexen-(3)-ylidene-methyl]-4-tert.-butyl phenylthioether is obtained in a yield of 58 g.; yellowish oil of B.P. $_{0.2 mm.}$ 157–168° C.

A mixture of 202 g. (1 mol) of n-dodecyl mercaptan, 124 g. (1 mol) of tetrahydrotolyl aldehyde and 200 ml. of xylene containing approximately 0.5 g. of p-toluene sulphonic acid is heated for 4 hours on a water separator until it boils. Following removal of the water, the reaction mixture is distilled under a high vacuum. [3-(or -4)-methylcyclohexen-(3)-ylidene-methyl] - n - dodecylthioether is obtained in a yield of 213 g.; yellowish oil of B.P.$_{0.15 mm.}$ 182–188° C.

(c) Production of [2,5-endomethylene-cyclohexen-(3)-ylidenemethyl]-n-hexylether

A mixture of 306 g. (3 mols) of n-hexanol-(1), 124 g. (1 mol) of 2,5-endomethylene-tetrahydrobenzaldehyde and 250 ml. of toluene containing 1 g. of p-toluene sulphonic acid and 1 ml. of pyridine is heated for one hour on a water separator until it boils. Following the removal of the water, the reaction mixture is distilled through a column to split up the acetal obtained as the first stage into alcohol and enolether. The fraction distilling over at 121–130° C./12 mm. Hg is then fractionated through a column to give 133 g. of [2,5-endomethylene-cyclohexen-(3)-ylidenemethyl]-n-hexylether in the form of a colourless, thinly liquid oil of B.P.$_{13 mm.}$: 130–133° C.

Other 2,5-endomethylene-cyclohexen-(3)-ylidene-methylethers or thioethers can be obtained by similarly reacting 2,5-endomethylene-tetrahydrobenzaldehyde with 1-butanol, 2-ethyl-1-hexanol, 3,5,5-trimethyl-1-hexanol and isomers, n-octanol-(1), n-dodecanol-(1) or benzyl alcohol; or with alkylated benzyl alcohols such as, for example, 3-methyl-benzyl alcohol, or with hydroxyalkylphenylethers such as 2-phenoxy-1-ethanol or 1-phenoxy-2-propanol, or with hydroxyalkyl alkylethers such as, for example, ethylene glycol monobutylether or diethylene glycol monoethyl ether or mercaptans such as 4-tert.-butyl thiophenol or n-dodecyl mercaptan.

What we claim is:

1. Compounds selected from the group consisting of

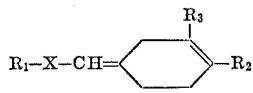

and

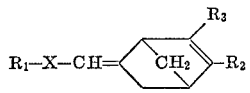

wherein $R_1$ is hydrocarbon containing from 3 to 18 carbon atoms or alkyl containing 3 to 18 carbon atoms interrupted by a —O— or —S— moiety, X is —O— or —S— and $R_2$ and $R_3$ are each selected from the group consisting of hydrogen and methyl.

2. Compounds of the formula

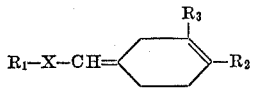

wherein $R_1$ is hydrocarbon containing from 3 to 18 carbon atoms, X is —O— or —S— and $R_2$ and $R_3$ are each selected from the group consisting of hydrogen and methyl.

3. Compounds of the formula

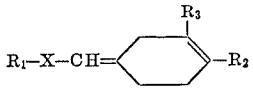

wherein $R_1$ is phenylalkyl containing between 1 and 3 carbon aatoms in said alkyl moiety, X is —O— or —S— and $R_2$ and $R_3$ are each selected from the group consisting of hydrogen and methyl.

4. [Cyclohexen-(3)-ylidene-methyl]-n-butylether.
5. [3- (or -4)-methylcyclohexen - (3) - ylidene-methyl]-n-butylether.
6. [Cyclohexen-(3)-ylidene-methyl]-n-hexylether.
7. [3 - (or -4)-methylcyclohexen - (3) - ylidene-methyl]-n-hexylether.
8. [Cyclohexen-(3)-ylidene-methyl]-i-octylether.
9. [3 - (or -4)-methylcyclohexen-(3)-ylidene-methyl]-n-octylether.
10. [3 - (or - 4-methylcyclohexen-(3)-ylidene-methyl]-i-octylether.
11. [Cyclohexen-(3)-ylidene-methyl]-i-nonylether.
12. [Cyclohexen-(3)-ylidene-methyl]-n-dodecylether.
13. [3 - (or -4)-methylcyclohexen-(3)-ylidene-methyl]-n-dodecylthioether.
14. [3 - (or -4) - methylcyclohexen-(3)-ylidene-methyl]-4-tert.-butylphenyl thioether.
15. [Cyclohexen-(3)-ylidene-methyl]-benzylether.
16. 2,5 - endomethylene-cyclohexen-(3)-ylidene-methyl]-n-hexylether.
17. [Cyclohexen-(3)-ylidene-methyl] - n - butyl-ethylene glycol ether.
18. [Cyclohexen-(3)-ylidene-methyl] - ethyl-diethylene glycol ether.
19. [Cyclohexen-(3)-ylidene-methyl] - phenyl-ethylene glycol ether.

References Cited

UNITED STATES PATENTS 2,487,525  11/1949  Copenhaver _____ 260—611

FOREIGN PATENTS 730,732  3/1966  Canada _____ 260—611
697,905  9/1953  Great Britain _____ 260—611

BERNARD HELFIN, Primary Examiner

U.S. Cl. X.R.

252—406, 407; 260—45.7 R, 45.7 S, 611 A, 611 F, 611 R